(12) United States Patent
Jagannatha et al.

(10) Patent No.: US 10,999,776 B2
(45) Date of Patent: *May 4, 2021

(54) APPLICATION-BASED USER EQUIPMENT ROUTE SELECTION POLICY MAPPING

(71) Applicant: Verizon Patent and Licensing Inc., Arlington, VA (US)

(72) Inventors: Deepa Jagannatha, Bridgewater, NJ (US); Mauricio Pati Caldeira De Andrada, South Plainfield, NJ (US); Lily Zhu, Parsippany, NJ (US); Kalyani Bogineni, Hillsborough, NJ (US); Kristen S. Young, Morris Plains, NJ (US); Sudhakar Reddy Patil, Flower Mound, TX (US); Ratul Kumar Guha, Warwick, PA (US); Jignesh S. Panchal, Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/794,581

(22) Filed: Feb. 19, 2020

(65) Prior Publication Data

US 2020/0187085 A1 Jun. 11, 2020

Related U.S. Application Data

(63) Continuation of application No. 16/214,796, filed on Dec. 10, 2018, now Pat. No. 10,602,422.

(51) Int. Cl.
*H04W 40/02* (2009.01)
*H04W 72/10* (2009.01)
*H04L 12/24* (2006.01)

(52) U.S. Cl.
CPC ......... *H04W 40/02* (2013.01); *H04L 41/0893* (2013.01); *H04W 72/10* (2013.01)

(58) Field of Classification Search
CPC .............................. H04W 28/06; H04W 48/14
See application file for complete search history.

(56) References Cited

U.S. PATENT DOCUMENTS

| | | | |
|---|---|---|---|
| 2004/0062262 | A1 | 4/2004 | Venteicher et al. |
| 2019/0053308 | A1 | 2/2019 | Castellanos et al. |
| 2019/0116521 | A1 | 4/2019 | Qiao et al. |
| 2019/0174405 | A1 | 6/2019 | Yang et al. |
| 2019/0394279 | A1* | 12/2019 | Dao ................ H04L 67/14 |
| 2020/0053622 | A1* | 2/2020 | Huang-Fu ........ H04L 65/1003 |
| 2020/0169921 | A1* | 5/2020 | Zhu ................ H04W 8/02 |

* cited by examiner

*Primary Examiner* — Muthuswamy G Manoharan (57) ABSTRACT

A device can receive, using an application policy handler (APH) component included in the device, a request for a data session for an application associated with the device. The device can identify, using the APH component included in the device, a user equipment route selection policy (URSP) rule, associated with the application, included in a URSP. The device can identify, using the APH component, a network slice specified by the URSP rule associated with the application and a data network specified by the URSP rule associated with the application. The device can attempt, using a modem component included in the device, to establish the data session using the network slice specified by the URSP rule associated with the application and the data network specified by the URSP rule associated with the application.

20 Claims, 9 Drawing Sheets

APPLICATION-BASED USER EQUIPMENT ROUTE SELECTION POLICY MAPPING

RELATED APPLICATION

This application is a continuation of U.S. patent application Ser. No. 16/214,796, filed Dec. 10, 2018, which is incorporated herein by reference.

BACKGROUND

5G/New Radio (5G/NR) can provide various enhancements to wireless communications, such as slicing, flexible bandwidth allocation, improved spectral efficiency, ultra-reliable low-latency communications (URLLC), beamforming, high-frequency communications, network slicing, and/or the like.

DETAILED DESCRIPTION OF PREFERRED EMBODIMENTS

The following detailed description of example implementations refers to the accompanying drawings. The same reference numbers in different drawings can identify the same or similar elements.

A user equipment (UE) can determine how to route, through a wireless communication network, traffic that is generated and/or received by the UE. For example, the UE can route traffic using a third generation partnership project (3GPP) radio access network (RAN) (e.g., a third generation (3G) RAN, a fourth generation (4G) RAN, a long term evolution (LTE) RAN, a fifth generation (5G) RAN, and/or the like), a non-3GPP RAN (e.g., a Wi-Fi RAN, a Bluetooth RAN, and/or the like), and/or the like. As another example, the UE can route traffic using an existing data session (e.g., a protocol data unit (PDU) session), by establishing a new data session, and/or the like.

However, with the establishment of network slicing, such as in a 5G wireless communication network, the UE can be unable to fully utilize the flexibility and operating efficiencies, offered by network slicing, to route traffic that is generated and/or received by the UE. For example, the UE can be associated with one or more applications (e.g., applications installed on the UE, applications used and/or accessed by the UE, and/or the like), and the UE can be unable to select particular network slices, of the wireless communication network, through which to route traffic that is associated with the one or more applications. As a result, the UE can experience an increase in latency associated with the one or more applications, can experience a decrease in throughput of the traffic associated with the one or more applications, can experience delayed and/or dropped traffic associated with the one or more applications, and/or the like, which in turn can cause a degraded user experience associated with the one or more applications.

Some implementations described herein provide a UE that includes an application policy handler (APH) component. The APH component is capable of receiving, storing, and/or using an application-based user equipment route selection policy (URSP) to route traffic, associated with an application that is associated with the UE, via a particular network slice and data network. The APH component can receive a request for a data session for an application associated with the device. The APH component can identify a URSP rule, associated with the application, included in a URSP, and can identify a network slice and a data network specified by the URSP rule. The APH component can attempt, using a modem component included in the UE, to establish the data session using the network slice and the data network specified by the URSP rule associated with the application.

In this way, the APH component can establish the data session, for the application, using a network slice and a data network that can be more optimized, more efficient, and/or more suitable for the application relative to other network slices and/or data networks, which allows the UE to utilize the flexibility and operating efficiencies, offered by network slicing, to route traffic that is associated with the application. This decreases the latency associated with the application, increases throughput of the traffic associated with the application, decreases delays in traffic routing and/or decreases the amount of dropped traffic associated with the application, and/or the like, which in turn can provide a better user experience for application.

FIGS. 1A-1D are diagrams of an example implementation 100 described herein. As shown in FIGS. 1A-1D, implementation 100 can include a user equipment (UE) and one or more networks. As further shown in FIGS. 1A-1D, the UE can include various components, such as an application policy handler (APH) component, a user equipment route selection policy (URSP) store, a modem component, and/or the like. The quantity and arrangement of devices and/or components illustrated in FIGS. 1A-1D is an example, and greater or fewer components and/or devices can be included in implementation 100.

The one or more networks can include various types of networks, such as a wireless radio access network (RAN), a core network, one or more data networks, and/or the like. The one or more data networks can include an Internet protocol (IP) multimedia subsystem (IMS) data network, the Internet, and/or other types of data networks.

In some implementations, the devices and software included in the wireless RAN and the core network can be used to provide a plurality of virtual networks referred to as network slices. In this way, the network slices can be configured and/or customized to provide a particular set of functionalities, to meet a particular set of objectives (e.g., low latency, high throughput, high reliability, and/or the like), and/or the like. In some implementations, a network slice can be configured and/or customized for a particular application and/or type of application, a particular service and/or type of service, a particular type of device, a particular customer, a particular network operator, and/or the like. Each network slice, of the plurality of network slices, can be configured with a respective network architecture, a respective engineering mechanism and network provisioning, and/or the like. Moreover, each network slice, of the plurality of network slices, can include a set of management capabilities, which can be independently controlled by a network operator, by a customer, and/or the like.

In some implementations, the devices and software included in the wireless RAN and the core network can be virtualized into a plurality of network slices such that each network slice, of the plurality of network slices, is isolated from the other network slices of the plurality of network slices. In this way, this lowers the risk of introducing and running new applications and services on the one or more networks, and also supports migration of applications and services because new technologies and/or architectures can be launched on a network slice that is isolated from the other slices. Moreover, the isolation between network slices provides increased security, because if a cyberattack breaches a particular network slice, the cyberattack can be contained and not able to spread beyond the network slice.

In some implementations, the UE can be associated with one or more applications. The one or more applications can be installed on the UE, can be accessed by the UE (e.g., via a web browser installed on the UE), and/or the like. The one or more applications can include various types of applications, such as a productivity application, a streaming video application, a gaming application, a social media application, and/or the like.

In some implementations, the APH component, included in the UE, is capable of receiving, storing, and/or using a URSP rule, included in a URSP, associated with an application to establish a data session for the application, to route traffic associated with an application, and/or the like. In some implementations, a URSP can include a data structure (e.g., an electronic table, an electronic tree, an electronic database, an electronic file, and electronic file system, and/or the like) that includes information identifying one or more URSP rules.

A URSP rule can be associated with one or more applications, and can include information identifying one or more parameters for establishing data sessions for the one or more applications, for routing traffic associated with the one or more applications, and/or the like. The one or more parameters can include a parameter that specifies a session and service continuity (SSC) mode for the one or more applications (e.g., a parameter that indicates that traffic associated with the one or more applications is to be routed via a data session that supports the identified SSC mode), a parameter that specifies a network slice selection for the one or more applications (e.g., a parameter that indicates that traffic associated with the one or more applications is to be routed via a data session using the identified network slice), a parameter that specifies a data network selection for the one or more applications (e.g., a parameter that indicates that traffic associated with the one or more applications is to be routed via a data session using the identified data network), a parameter that specifies an access type for the one or more applications (e.g., a parameter that indicates that traffic associated with the one or more applications is to be routed via a data session using the identified access type), a parameter that specifies a data session type for the one or more applications (e.g., a parameter that indicates that traffic associated with the one or more applications is to be routed via a data session of the identified data session type), and/or the like.

In some implementations, one or more network function devices, included in the one or more networks, can generate and maintain a URSP, such as a policy control function (PCF) device, an access and mobility management function (AMF) device, and/or the like. In some implementations, the one or more network function devices can dynamically generate a URSP for new applications based on detecting traffic, in the one or more networks, associated with the new application.

In some implementations, the one or more network function devices can generate a URSP such that the URSP is specific to a particular UE (e.g., such that the URSP associated with the UE only includes URSP rules for the one or more applications associated with the UE), such that the URSP is generic for all UEs that are associated with the one or more networks (e.g., such that the URSP includes rules for applications that have been configured to utilize network slice selection and/or data network selection in the one or more networks), such that the URSP is configured for a subset of UEs that are associated with the one or more networks (e.g., based on UE type, such as a URSP for smartphones, a URSP for tablets, a URSP for an IoT device, a mobile UE, a fixed UE, a UE associated with a vehicle, and/or the like; based on similar subscriber agreements associated with the subset of UEs; based on a similar operating system being installed on the subset of UEs; and/or the like), and/or the like. In some implementations, the one or more network function devices can maintain a URSP by updating the URSP as new URSP rules are generated for an application, as URSP rules are removed for an application, as URSP rules are modified for an application, and/or the like.

Figure 1A:
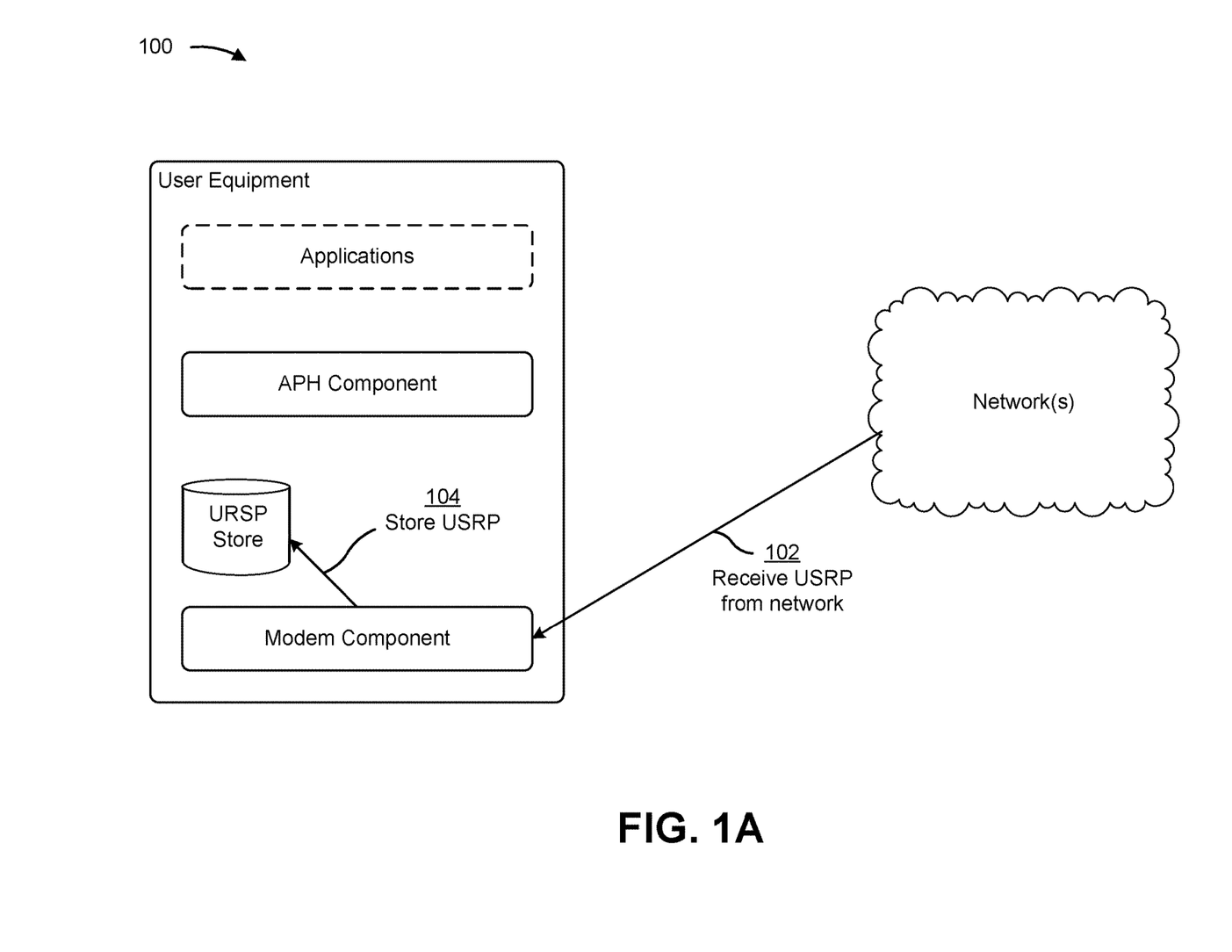
FIGS. 1A-1D are diagrams of an example implementation described herein.

As shown in FIG. 1A, and reference number 102, to configure the UE to use a URSP rule associated with one or more applications, one or more network function devices, included in the one or more networks, can transmit a URSP to the UE. For example, a PCF device on the network can generate and maintain the URSP, and can transmit the URSP to the UE via a session management function (SMF) device, a user plane function (UPF) device, a base station, and/or the like. In some implementations, the one or more network function devices can transmit the URSP to the UE based on an event (e.g., based on the UE communicatively connecting to a base station included in the one or more networks, based on the UE installing a new application on the UE, and/or the like), at a particular time interval, based on receiving a request from the UE for the URSP, and/or the like.

The UE can receive the URSP via a modem component included in the UE (e.g., a component that converts digital data into signals that can be transmitted to the one or more networks, that converts signals received from the one or more networks into digital data that can be used by the UE, and/or the like). As shown by reference number 104, the modem component can receive the URSP from the one or more network function devices included in the one or more networks, and can store the URSP in a URSP store (e.g., a data structure, a storage device, a memory device, and/or the like, that is configured to store the URSP) included in the UE. In some implementations, the modem component can receive the URSP from the one or more network function devices included in the one or more networks, and can provide the URSP to the APH component, which can store the URSP in the URSP store.

Figure 1B:
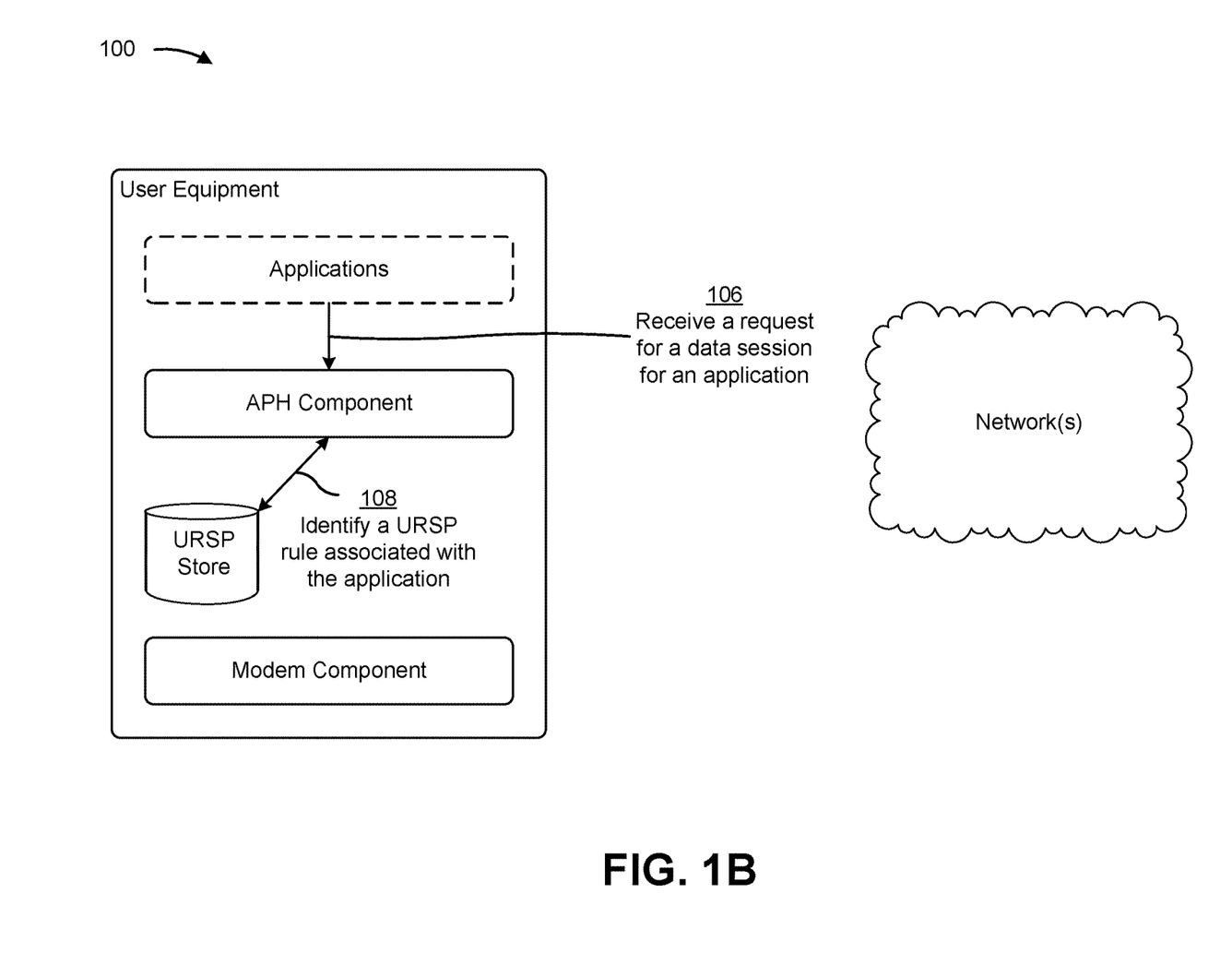

As shown in FIG. 1B, and by reference number 106, the APH component can receive, from an application of the one or more applications associated with the UE, for a data session for the application. The data session can include a data session for the application to communicate with an application server associated with the application, a data session for the application to communicate with an application cloud platform associated with the application, a data session for the application to communicate with another UE, and/or the like. In some implementations, the application can transmit the request to the APH component based on receiving an instruction to transmit the request (e.g., via input from a user of the UE), based on the application generating traffic that is to be transmitted via the data session, and/or the like.

As shown by reference number 108, the APH component, based on receiving the request for the data session for the application, can search the URSP, stored in the URSP store, to identify a URSP rule associated with the application. In some implementations, if the APH component does not identify a URSP rule associated with the application (e.g., because there is no URSP rule, associated with the application, included in the URSP), the UE can use a default network slice and data network configuration (e.g., a default network slice and data network configuration specified in the URSP, a default network slice and data network configuration configured for the UE, and/or the like) to establish the data session for the application.

Figure 1C:
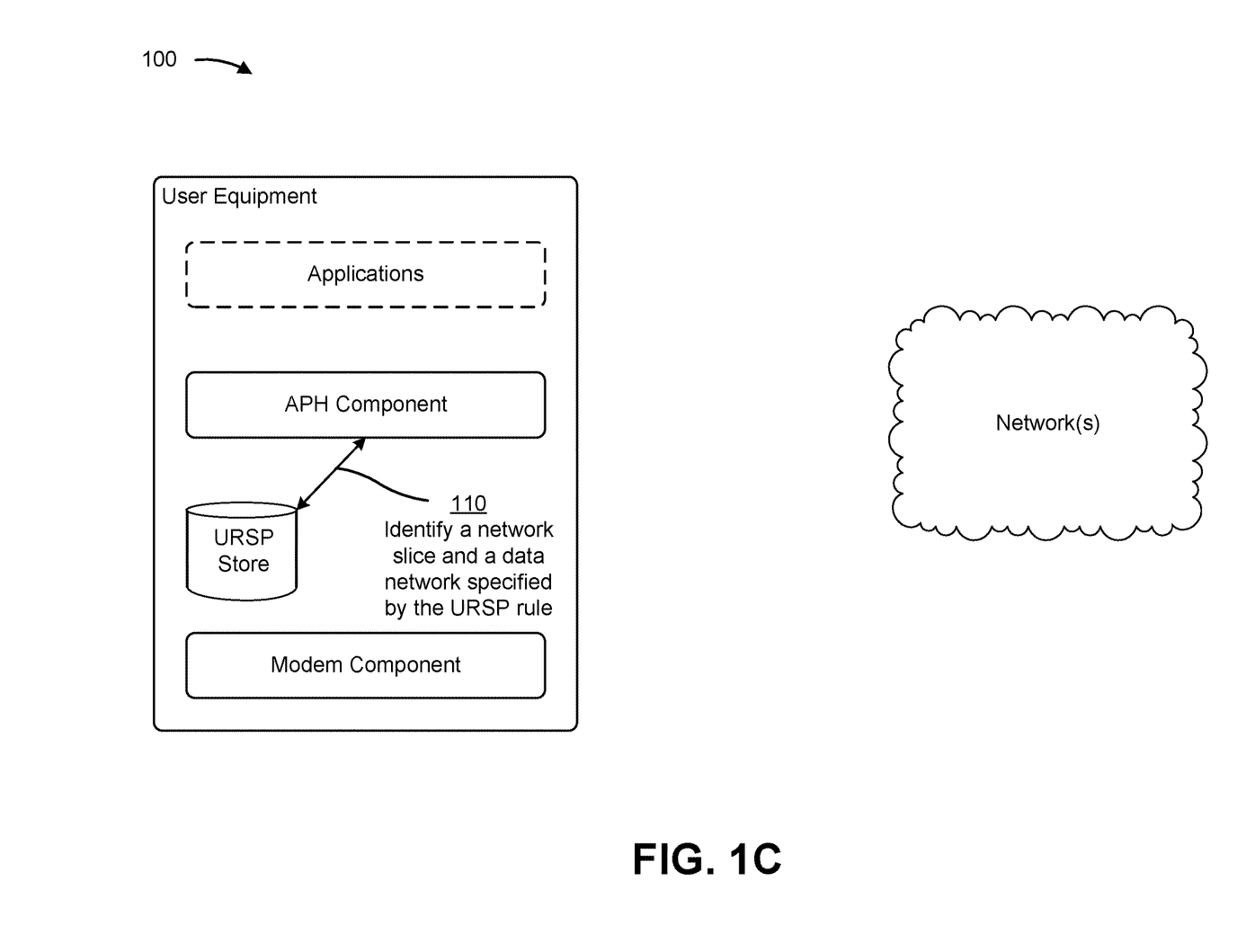

As shown in FIG. 1C, and by reference number 110, if the APH component identifies a URSP rule associated with the application, the APH component can identify a network slice and a data network specified by the URSP rule. In some implementations, the network slice and the data network, specified by the URSP rule, can be included in a route selection descriptor that is included in the URSP rule. The route selection descriptor can include information specifying a combination of parameters for establishing the data session for the application, for routing traffic associated with the application, and/or the like. The combination of parameters can include an SSC mode parameter, a network slice parameter, a data network parameter, an access type parameter, a data session type parameter, and/or the like. Accordingly, the APH component can traverse the URSP rule, associated with the application, to identify the route selection descriptor, and can traverse the route selection descriptor to identify the network slice, specified by the network slice parameter, that is to be used for the data session for the application, and to identify the data network, specified by the data network parameter, that is to be used for the data session for the application.

In some implementations, if the APH component identifies a URSP rule associated with the application, the URSP rule can include a plurality of route selection descriptors that specify a respective combination of parameters for establishing the data session for the application, for routing traffic associated with the application, and/or the like. For example, the URSP rule, associated with the application, can include a first route selection descriptor that specifies a first combination of parameters, can include a second route selection descriptor that specifies a second combination of parameters, and/or the like. In this case, the URSP rule can specify a respective priority, a respective precedence, and/or the like, for each route selection descriptor of the plurality of route selection descriptors.

In this way, the APH component can identify the plurality of route selection descriptors included in the URSP rule, and can determine which route selection descriptor to use, for establishing the data session for the application, based on the respective priorities. For example, if the request for the data session for the application does not specify a particular data network that is to be used for the data session, the APH component can select the route selection descriptor with the greatest priority relative to the other route selection descriptors included in the plurality of route selection descriptors as the default route selection descriptor (and thus the default network slice and default data network specified by the default route selection descriptor). As another example, if the request for the data session for the application specifies a particular data network that is to be used for the data session, the APH component can select the route selection descriptor, with the greatest priority relative to the other route selection descriptors included in the plurality of route selection descriptors, that includes the particular data network as a parameter.

In some implementations, the respective priorities for the plurality of route selection descriptors can be determined by a network operator of the one or more networks, can be determined by a developer of the application, can automatically be determined by one or more network function devices included in the one or more networks (e.g., the one or more network function devices can automatically determine the respective priorities based on service and/or performance requirements for the application, such as latency, throughput, reliability, and/or the like), and/or the like.

Figure 1D:
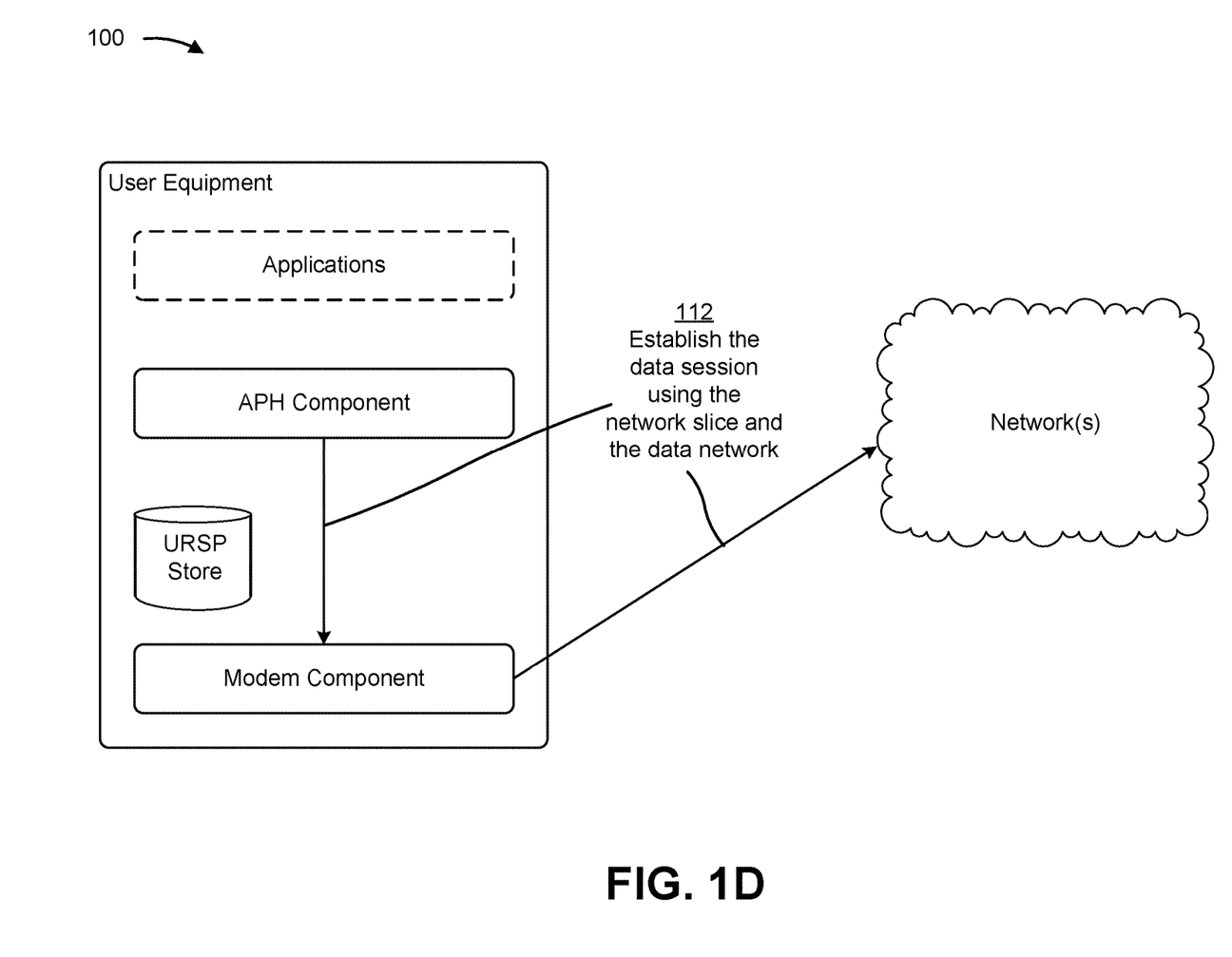

As shown in FIG. 1D, and by reference number 112, the APH component can use the modem component to attempt to establish the data session, for the application, using the network slice and the data network specified in the URSP rule associated with the application. In this way, the APH component can instruct the modem component to request that a UPF device, included in the one or more networks, establish the data session with an endpoint (e.g., an application server, an application cloud platform, another UE, and/or the like) via the specified data network (e.g., by specifying an access point name (APN) associated with the data network, by specifying a data network name (DNN) associated with the data network, and/or the like). Moreover, in this way, the APH component can instruct the modem component to request that a network slice selection function (NSSF) device, included in the one or more networks, service the data session with the identified network slice (e.g., by specifying a single network slice selection assistance information (S-NSSAI) identifier associated with the specified network slice).

In some implementations, if the attempt to establish the data session using the specified network slice is unsuccessful (e.g., due to the network slice being unable to accommodate the data session, such as due to the network slice being fully utilized by higher priority UEs), the APH component can determine whether the URSP rule, associated with the application, includes another route selection descriptor (e.g., the next greatest priority route selection descriptor), and can use the network slice and data network, specified in the other route selection descriptor, to attempt to establish the data session for the application. In this way, if the preferred network slice for the application is unavailable, the APH can continue to attempt to establish the data session using other network slices that can still be more appropriately configured for the application than a default network slice configuration for the UE.

In some implementations, the UE can receive an updated URSP from one or more network function devices included in the one or more networks. For example, the one or more network function devices, included in the one or more networks, can generate the updated URSP by updating the information included in the URSP (e.g., by modifying the information included in the URSP, by adding additional information to the URSP, by removing information from the URSP, and/or the like), and can transmit the updated URSP to the UE (e.g., based on generating the updated URSP, based on a periodic schedule for transmitting URSP updates to the UE, based on receiving a request from the UE for the updated URSP, and/or the like). In this way, the URSP can be updated to provide new URSP rules for newly supported applications, can be updated to modify a URSP rule associated with an application so that data sessions for the application are more efficiently serviced with better network slices and/or data networks for the application, can be updated to provide the UE with support for an application newly installed, downloaded, and/or utilized by the UE, and/or the like.

In some implementations, the updated URSP can include a new URSP rule, can include a modified URSP rule, can exclude a URSP rule that was removed from the URSP, and/or the like. In some implementations, a modified URSP rule can include information identifying an additional application to which the modified URSP rule is associated, can exclude information identifying an application that was associated with the modified URSP rule before the modified URSP rule was modified, can include information specifying a new route selection descriptor, can include information specifying a modified route selection descriptor (e.g., a rule selection descriptor that includes a modified combination of parameters, such as a modified SSC mode parameter, a modified network slice parameter, a modified data network parameter, a modified access type parameter, and/or the like), can exclude information identifying a route selection descriptor that was removed from the modified URSP rule, and/or the like.

In some implementations, the UE can receive the updated URSP and can attempt to establish another data session, for the application, based on the updated URSP. For example, if the updated URSP includes a modified URSP rule, associated with the application, that specifies a modified network slice parameter, the APH component can identify the modified network slice specified by the modified URSP rule, and can attempt to establish the other data session, for the application, using the other network slice specified by the modified URSP rule.

In this way, the APH component can establish the data session, for the application, using a network slice and a data network that can be more optimized, more efficient, and/or more suitable for the application relative to other network slices and/or data networks, which allows the UE to utilize the flexibility and operating efficiencies, offered by network slicing, to route traffic that is associated with the application. This decreases the latency associated with the application, increases throughput of the traffic associated with the application, decreases delays in traffic routing and/or decreases the amount of dropped traffic associated with the application, and/or the like, which in turn can provide a better user experience for application.

As indicated above, FIGS. 1A-1D are provided merely as an example. Other examples can differ from what is described with regard to FIGS. 1A-1D.

Figure 2:
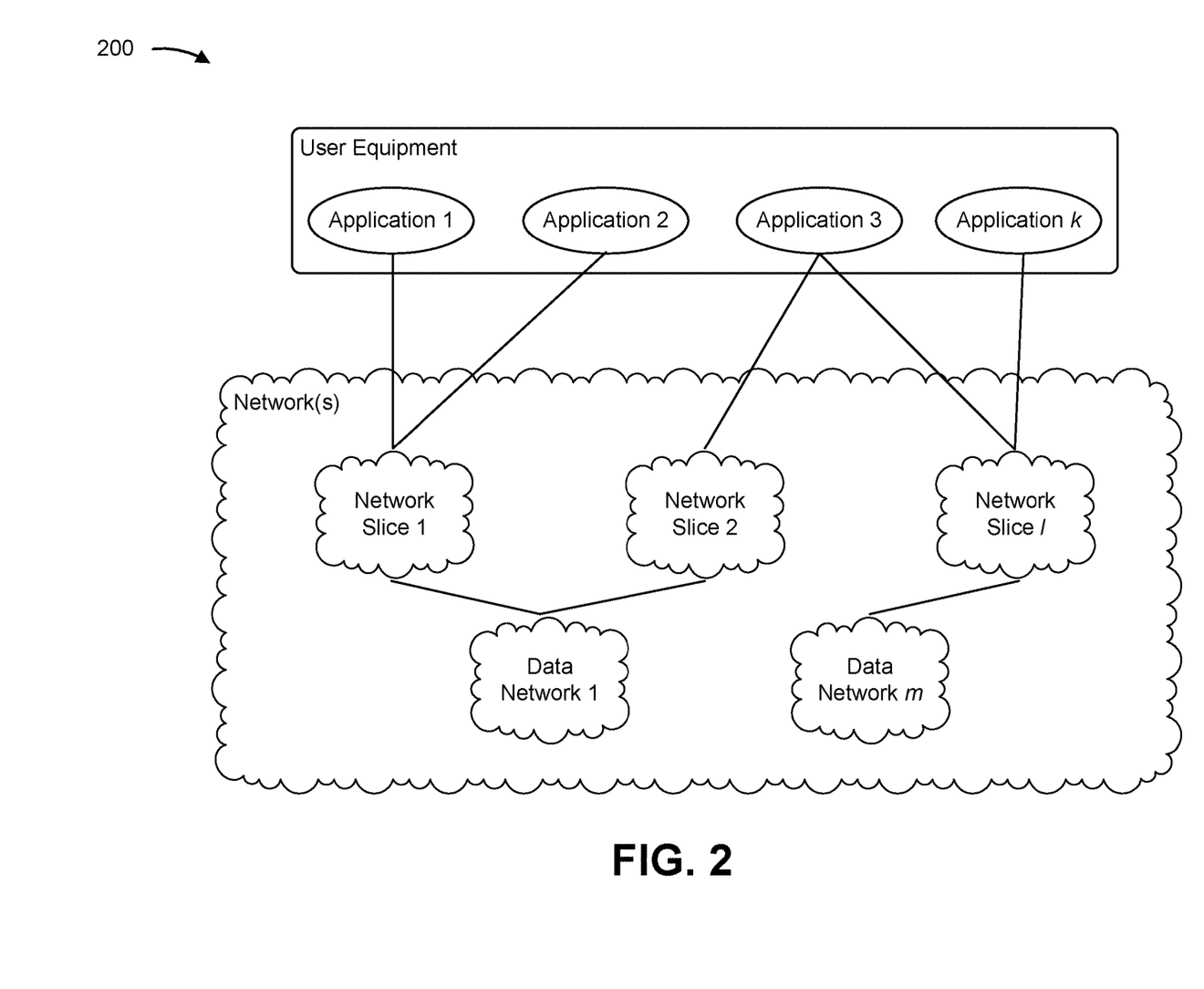
FIG. 2 is a diagram of an example network mapping of a user equipment route selection policy (URSP) described herein.

FIG. 2 is a diagram of an example network mapping 200 of a URSP described herein. As shown in FIG. 2, network mapping 200 can include a user equipment (UE) and one or more networks. The quantity and arrangement of devices and/or components illustrated in FIG. 2 is an example, and greater or fewer components and/or devices can be included in network mapping 200.

As shown in FIG. 2, the UE can be associated with a plurality of applications (e.g., application 1 through application k). Each application, of the plurality of applications, can be associated with one or more URSP rules included in a URSP stored on the UE. Each URSP rule, associated with a particular application, can specify a network slice (e.g., a network slice of network slice 1 through network slice 1), a data network (e.g., a data network of data network 1 through data network m), and/or the like, that is to be used for a data session for the application.

For example, in example network mapping 200, the URSP can include a URSP rule, associated with application 1, that specifies that network slice 1 and data network 1 are to be used for a data session associated with application 1. As another example, the URSP can include a URSP rule, associated with application 2, that specifies that network slice 1 and data network 1 are to be used for a data session associated with application 2. As another example, the URSP can include a URSP rule, associated with application 3, that includes a first route selection descriptor that specifies network slice 2 and data network 1 are to be used for a data session associated with application 3, and that includes a second route selection descriptor that specifies network slice 1 and data network m are to be used for the data session associated with application 3. In this way, an APH component, included in the UE, can attempt to establish the data session using the first route selection descriptor, and can attempt to establish the data session using the second route selection descriptor if the attempt to establish the data session using the first route selection descriptor is unsuccessful. As another example, the URSP can include a URSP rule, associated with application k, that specifies that network slice l and data network m are to be used for a data session associated with application k.

As indicated above, FIG. 2 is provided merely as an example. Other examples can differ from what is described with regard to FIG. 2.

Figure 3:
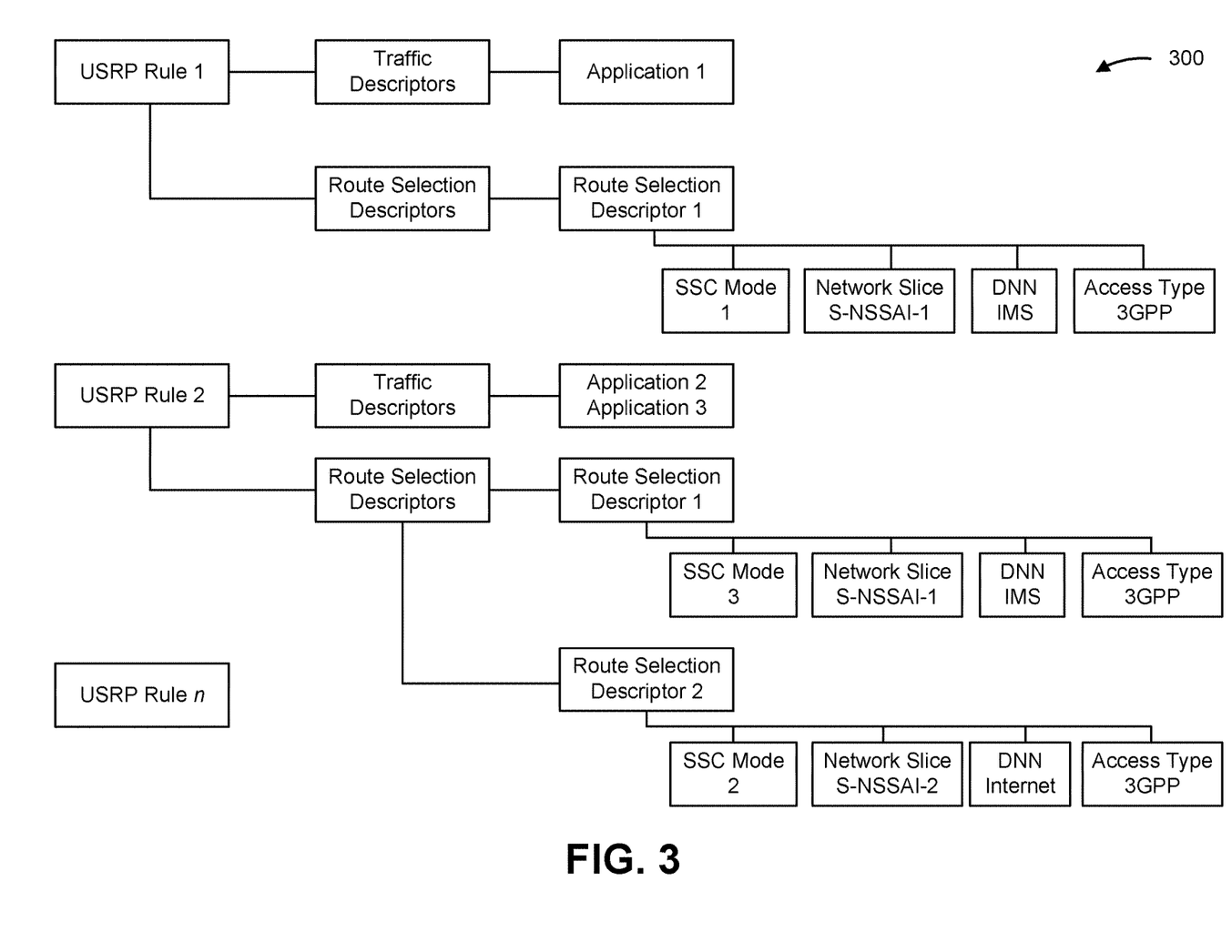
FIG. 3 is a diagram of an example URSP.

FIG. 3 is a diagram of an example URSP 300 described herein. In some implementations, an APH component, included in a UE, can use URSP to establish a data session for an application, to route traffic, associated with the application, via the data session for the application, and/or the like. As shown in FIG. 3, URSP 300 can include one or more URSP rules (e.g., URSP rule 1 through URSP rule n), wherein each URSP rule can include one or more traffic descriptors and one or more route selection descriptors. The quantity and arrangement of elements illustrated in FIG. 3 is an example, and greater or fewer elements can be included in URSP 300.

As shown in FIG. 3, URSP rule 1, included in example URSP 300, can include a traffic descriptor that identifies an application (e.g., application 1), identifies an application type associated with the application (e.g., a productivity application, a streaming video application, a social media application, and/or the like), and/or the like. In this way, the APH component, included in the UE, can traverse URSP rule 1 to identify the traffic descriptor associated with URSP rule 1, can identify that the traffic descriptor, associated with URSP rule 1, specifies application 1, and accordingly can determine that URSP rule 1 is associated with application 1. As further shown in FIG. 3, URSP rule 1 can include a route selection descriptor, associated with application 1, that specifies a combination of parameters for establishing a data session for application 1, for routing traffic associated with application 1, and/or the like. The combination of parameters can include an SSC mode parameter, a network slice parameter, a data network parameter, an access type parameter, and/or the like.

In some implementations, the SSC mode parameter can specify how a network address (e.g., an IP address, a port identifier, and/or the like), assigned to the UE and associated with the data session, is to be managed for the data session. For example, an SSC mode 1 can indicate that the network address associated with the data session is to be maintained for the entire data session (e.g., the network address is not to change during the data session) regardless of the mobility of the UE. As another example, an SSC mode 2 can indicate that a UPF device, that anchors the data session, is permitted to release the network address, assigned to the UE and associated with the data session, that another UPF device is permitted to assign a new network address to the UE and associate the new network address with the data session, and/or the like. As another example, an SSC mode 3 can indicate a make-before-break SSC mode, in that a UPF device, that anchors the data session, is permitted to release the network address, assigned to the UE and associated with the data session, after another UPF device has assigned a new network address to the UE and associated the new network address with the data session.

In some implementations, the network slice parameter can specify the network slice that is to be used for the data session. For example, the network slice parameter can specify a network slice identifier (e.g., a S-NSSAI) associated with the specified network slice. In some implementations, the data network parameter can specify an APN or DNN associated with the data network (e.g., an IMS, the Internet, and/or the like) specified in the route selection descriptor. As another example, the access type parameter can specify whether a 3GPP access network (e.g., a 3G wireless RAN, a 4G wireless RAN, an LTE wireless RAN, a 5G wireless RAN, and/or the like) is to be used for the data session, whether a non-3GPP access network (e.g., a Wi-Fi network, a Bluetooth network and/or the like) is to be used for the data session, and/or the like.

As further shown in FIG. 3, a URSP rule can include a plurality of traffic descriptors and/or a plurality of route selection descriptors. For example, URSP rule 2 specifies application 2 and application 3 as traffic descriptors. In this way, the APH component, included in the UE, can determine that URSP rule 2 applies to both application 2 and application 3. As another example, URSP rule 2 specifies a plurality of route selection descriptors, each of which have a respective combination of parameters for a data session associated with application 2 and a data session associated with application 3. Moreover, URSP rule 2 can specify a route selection descriptor priority for the plurality of route selection descriptors. For example, route selection descriptor 1 can indicate that route selection descriptor 1 is the greatest priority in URSP rule 2, route selection descriptor 2 can indicate that route selection descriptor 2 is second greatest priority in URSP rule 2, and so on.

As indicated above, FIG. 3 is provided merely as an example. Other examples can differ from what is described with regard to FIG. 3.

Figure 4:
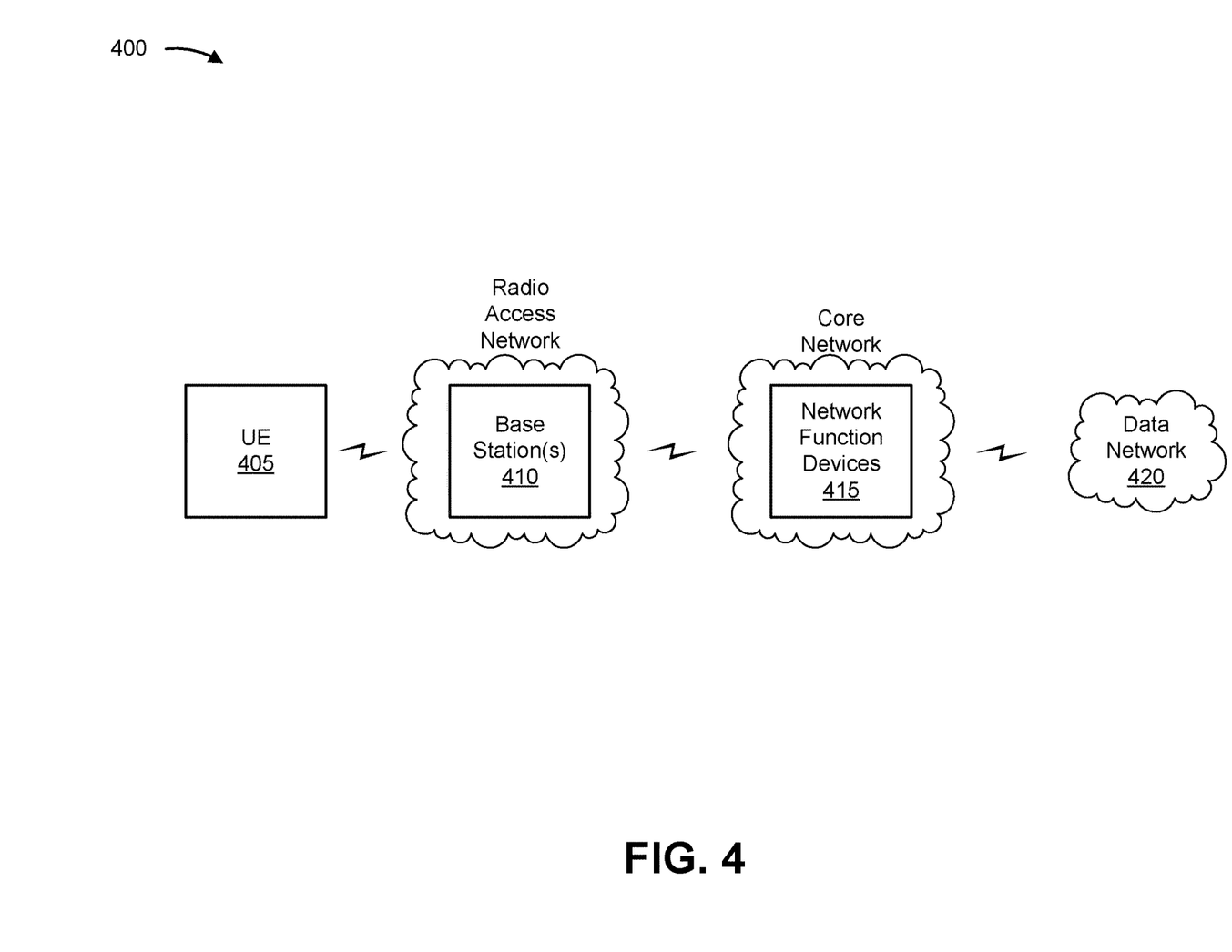
FIG. 4 is a diagram of an example environment in which systems and/or methods described herein can be implemented.

FIG. 4 is a diagram of an example environment 400 in which systems and/or methods, described herein, can be implemented. As shown in FIG. 4, environment 400 can include a user equipment (UE) 405; one or more base stations 410 (collectively referred to as "base stations 410" and individually as "base station 410"); a plurality of network function devices 415 (collectively referred to as "network function devices 415" and individually as "network function device 415"); and one or more data networks 420 (collectively referred to as "data network 420" and individually as "data network 420"). Devices of environment 400 can interconnect via wired connections, wireless connections, or a combination of wired and wireless connections. Some implementations can be performed within a 5G network and/or the like.

Environment 400 can include a radio access network (RAN), such as a 5G next generation RAN (NG-RAN) and/or the like. The RAN can include one or more base stations 410 via which UE 405 communicates with the core network. The core network can include a 5G next generation core network (NG Core) and/or the like. The core network can include network function devices 415 that enable UE 405 to communicate with data network 420.

UE 405 includes one or more devices capable of communicating with base station 410 and/or a network (e.g., data network 420). For example, UE 405 can include a wireless communication device, an IoT device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. In some implementations, UE 405 can receive a URSP from one or more network function devices 415, can store the URSP in a URSP store included in UE 405, and/or the like. In some implementations, UE 405 can include an application policy handler (APH) component that is capable of receiving, storing, and/or using an application-based user equipment route selection policy (URSP) to route traffic, associated with an application that is associated with the UE, via a particular network slice and data network, and/or the like.

Base station 410 includes one or more devices capable of transferring traffic, such as audio, video, text, data and/or other traffic, destined for and/or received from UE 405. In some implementations, base station 410 can receive traffic from and/or sends traffic to data network 420 via one or more network function device 415, and/or the like. Base station 410 can send traffic to and/or receive traffic from UE 405 via an air interface. In some implementations, base station 410 can include one or more small cell base stations, such as a base station of a microcell, a picocell, and/or a femtocell; one or more macrocell base stations, such as a gNodeB and/or the like.

Network function devices 415 include one or more devices capable of communicating with UE 405, with base station 410, with data network 420, and/or the like. In some implementations, network function devices 415 can include a user plane function (UPF) device, a session management function (SMF) device, an access and mobility management function (AMF) device, a policy control function (PCF) device, a network slice selection function (NSSF) device, and/or the like. In some implementations, network function devices 415 can be implemented on physical devices, such as a gateway, a mobility management entity, and/or the like.

The UPF device can communicatively connect base station 410 (and therefore UE 405) to data networks 420. The UPF device can receive one or more packets from UE 405, can apply one or more rules to the one or more packets to process the one or more packets, can transmit the packets to data network 420, and/or the like. The SMF device can establish, modify, and/or terminate a data session for UE 405. For example, the SMF device can assign a network address to UE 405 during establishment of the data session, can release the network address from UE 405 during termination of the data session, and/or the like. The AMF device can manage the registration of UE 405 with base station 410, can monitor the location of UE 405, can manage the reachability of UE 405, and/or the like.

The PCF device can generate one or more rules for the data session associated with UE 405. The one or more rules can include one or more URSP rules, one or more mobility management rules (e.g., a service continuity rule, such as a rule that controls how packets are handled when an IP address changes during the data session, a data session continuity rule, such as a rule that controls how the data session is to be maintained based on the mobility of UE 405, and/or the like), and/or the like.

In some implementations, the hardware and/or software implementing network function devices 415 can be virtualized (e.g., through the use of network function virtualization and/or software-defined networking), thereby allowing for the use of composable infrastructure when implementing network function devices 415. In this way, networking, storage, and compute resources can be allocated to implement the network slices, described above in FIGS. 1A-1D, 2, and 3, in a flexible manner as opposed to relying on dedicated hardware and software to implement these functions. In some implementations, NSSF device manages the network slices, assigns network slices to data sessions associated with UE 405, and/or the like.

Data network 420 can include one or more wired and/or wireless networks. For example, data network 420 can include a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 4 are provided as an example. In practice, there can be additional devices and/or networks, fewer devices and/or networks, different devices and/or networks, or differently arranged devices and/or networks than those shown in FIG. 4. Furthermore, two or more devices shown in FIG. 4 can be implemented within a single device, or a single device shown in FIG. 4 can be implemented as multiple, distributed devices. Additionally, or alternatively, a set of devices (e.g., one or more devices) of environment 400 can perform one or more functions described as being performed by another set of devices of environment 400.

Figure 5:
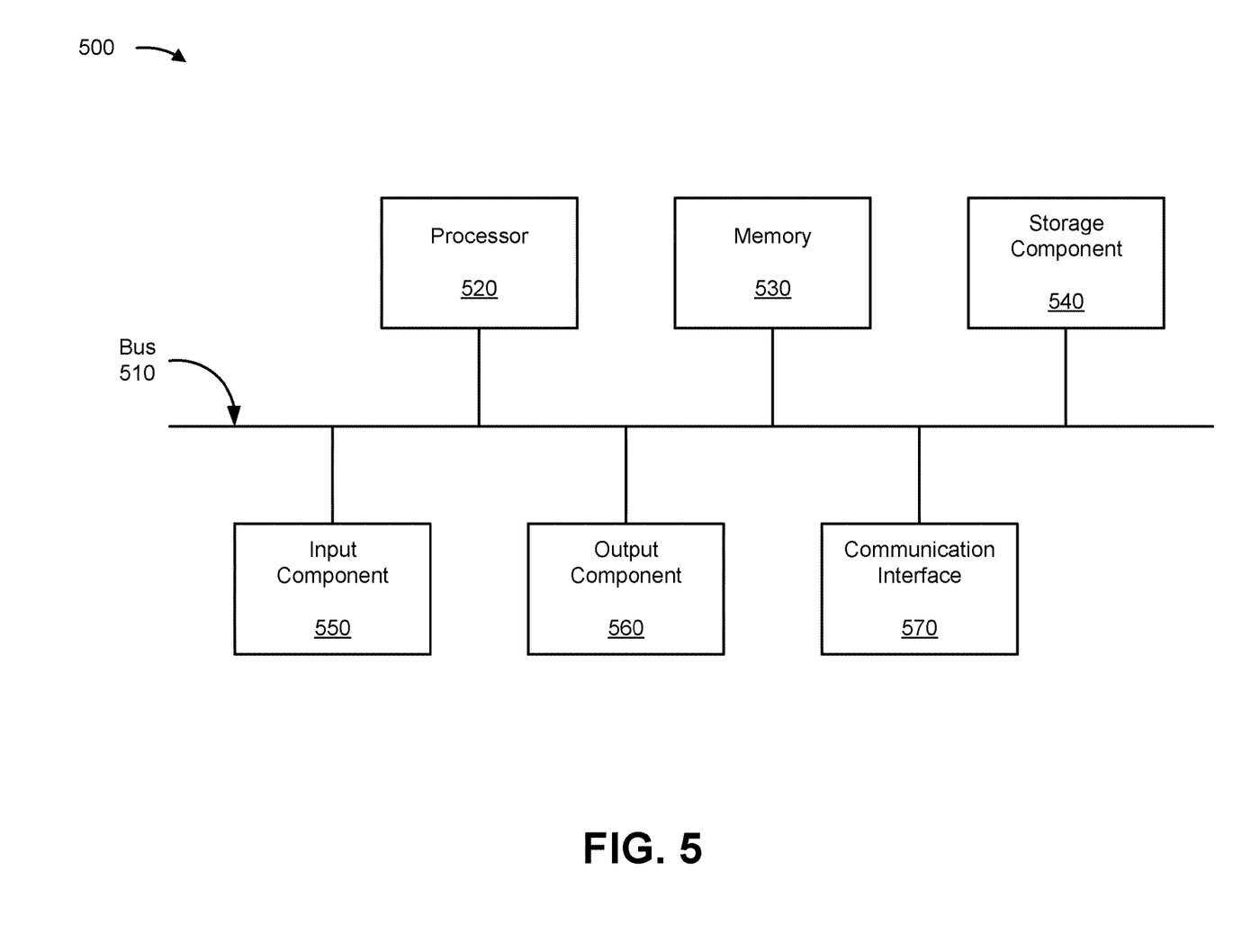
FIG. 5 is a diagram of example components of one or more devices of FIG. 4.

FIG. 5 is a diagram of example components of a device 500. Device 500 can correspond to UE 405, base station 410, network function device 415, and/or one or more devices included in data network 420. In some implementations, UE 405, base station 410, network function device 415, and/or one or more devices included in data network 420 can include one or more devices 500 and/or one or more components of device 500. As shown in FIG. 5, device 500 can include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 can include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a wireless local area network interface, a cellular network interface, or the like.

Device 500 can perform one or more processes described herein. Device 500 can perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

Figure 6:
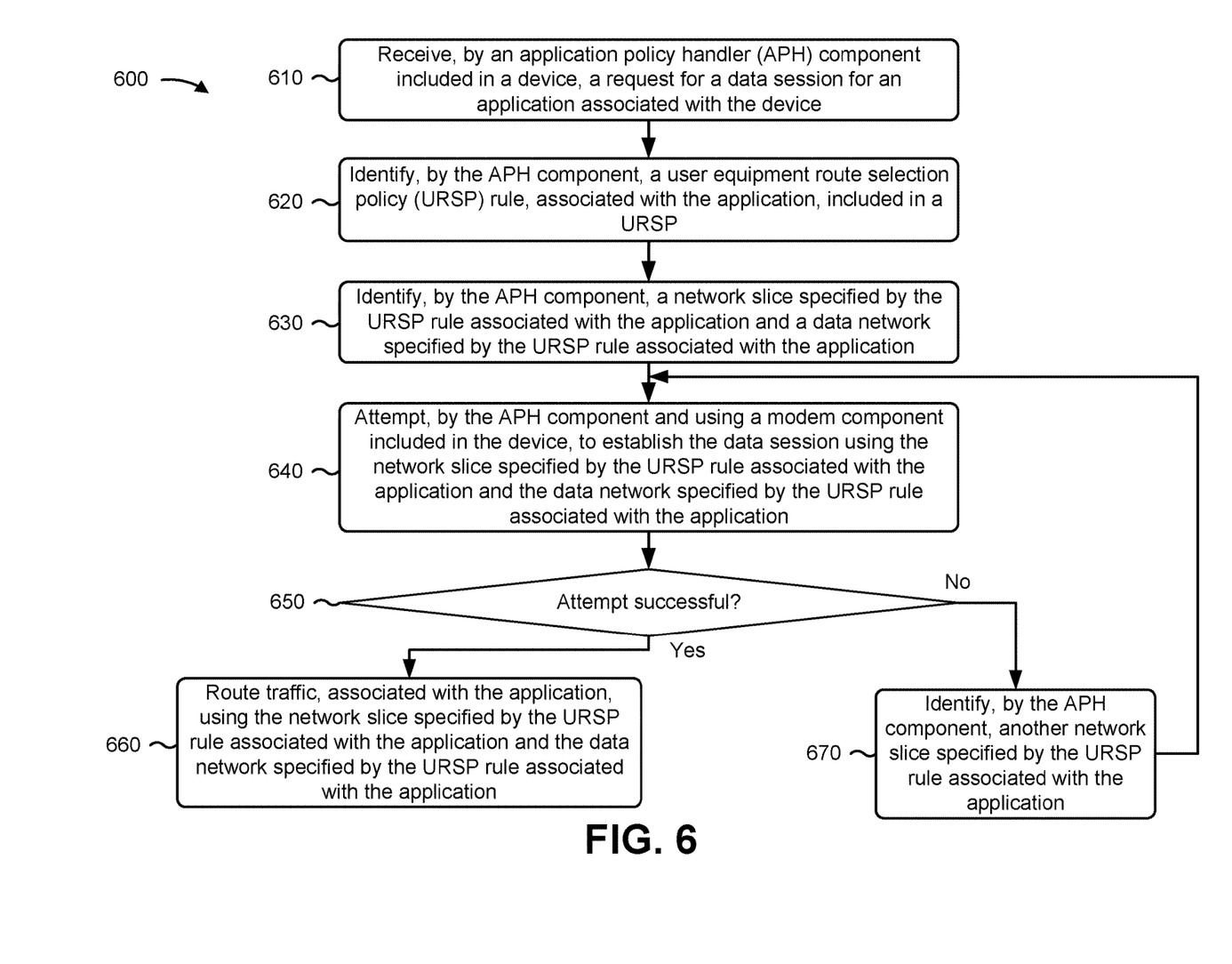
FIG. 6 is a flow chart of an example process for application-based user equipment route selection policy mapping.

FIG. 6 is a flow chart of an example process 600 for application-based user equipment route selection policy mapping. In some implementations, one or more process blocks of FIG. 6 can be performed by a device such as a user equipment (UE) (e.g., UE 405). In some implementations, one or more process blocks of FIG. 6 can be performed by another device or a group of devices separate from or including the device, such as a base station (e.g., base station 410), a network function device (e.g., network function device 415), and/or the like.

As shown in FIG. 6, process 600 can include receiving, by an application policy handler (APH) component included in a device, a request for a data session for an application associated with the device (block 610). For example, the device (e.g., using processor 520, memory 530, storage component 540, input component 550, communication interface 570, and/or the like) can receive, using an application policy handler (APH) component included in the device, a request for a data session for an application associated with the device, as described above.

As further shown in FIG. 6, process 600 can include identifying, by an application policy handler (APH) component included in the device, a user equipment route selection policy (URSP) rule, associated with the application, included in a URSP (block 620). For example, the device (e.g., using processor 520, memory 530, storage component 540, input component 550, output component 560, communication interface 570, and/or the like) can identify, using an application policy handler (APH) component included in the device, a user equipment route selection policy (URSP) rule, associated with the application, included in a URSP, as described above.

As further shown in FIG. 6, process 600 can include identifying, by the APH component, a network slice specified by the URSP rule associated with the application and a data network specified by the URSP rule associated with the application (block 630). For example, the device (e.g., using processor 520, memory 530, storage component 540, input component 550, output component 560, communication interface 570, and/or the like) can identify, using the APH component, a network slice specified by the URSP rule associated with the application and a data network specified by the URSP rule associated with the application, as described above.

As further shown in FIG. 6, process 600 can include attempting, by the APH component and using a modem component included in the device, to establish the data session using the network slice specified by the URSP rule associated with the application and the data network specified by the URSP rule associated with the application (block 640). For example, the device (e.g., using processor 520, memory 530, storage component 540, input component 550, output component 560, communication interface 570, and/or the like) can attempt, using the APH component and a modem component included in the device, to establish the data session using the network slice specified by the URSP rule associated with the application and the data network specified by the URSP rule associated with the application, as described above.

As further shown in FIG. 6, process 600 can include determining, by the APH component, whether the attempt to establish the data session using the network slice specified by the URSP rule associated with the application was successful (block 650). For example, the device (e.g., using processor 520, memory 530, storage component 540, input component 550, output component 560, communication interface 570, and/or the like) can determine, using the APH component, whether the attempt to establish the data session using the network slice specified by the URSP rule associated with the application was successful, as described above.

As further shown in FIG. 6, if the device determines that attempt to establish the data session using the network slice specified by the URSP rule associated with the application was unsuccessful (block 650—Yes), process 600 can include routing traffic, associated with the application, using the network slice specified by the URSP rule associated with the application and the data network specified by the URSP rule associated with the application (block 660). For example, the device (e.g., using processor 520, memory 530, storage component 540, input component 550, output component 560, communication interface 570, and/or the like) can routing traffic, associated with the application, using the network slice specified by the URSP rule associated with the application and the data network specified by the URSP rule associated with the application, as described above.

As further shown in FIG. 6, if the device determines that attempt to establish the data session using the network slice specified by the URSP rule associated with the application was unsuccessful (block 650—No), process 600 can include identifying, by the APH component and based on a route selection descriptor priority specified in the URSP rule associated with the application, another network slice specified by the URSP rule associated with the application (block 670). For example, the device (e.g., using processor 520, memory 530, storage component 540, input component 550, output component 560, communication interface 570, and/or the like) can identify, using the APH component and based on a route selection descriptor priority specified in the URSP rule associated with the application, another network slice specified by the URSP rule associated with the application, as described above. In this case, process 600 can include returning to block 640 to attempt to establish the data session using the other network slice specified by the URSP rule associated with the application and the data network specified by the URSP rule associated with the application.

Process 600 can include additional implementations, such as any single implementation or any combination of implementations described below and/or in connection with one or more other processes described elsewhere herein.

In some implementations, the data network specified by the URSP rule associated with the application comprises a default data network specified by the URSP rule associated with the application, the device can determine that the request for the data session does not specify a particular data network, and when identifying the data network specified by the URSP rule associated with the application, the device can identify the default data network based on determining that the request for the data session does not specify a particular data network.

In some implementations, the device can identify a session and service continuity (SSC) mode specified by the URSP rule associated with the application, and can, when attempting to establish the data session, attempt to establish the data session based on the SSC mode specified by the URSP rule associated with the application. In some implementations, when identifying the URSP rule associated with the application, the device can identify a traffic descriptor field included in the URSP rule, and can determine that the traffic descriptor field, included in the URSP rule, identifies the application.

In some implementations, the network slice and the data network are specified in a route selection descriptor of a plurality of route selection descriptors included in the URSP rule, and the device can, when identifying the network slice and the data network, identify the route selection descriptor based on a route selection descriptor priority associated with the route selection descriptor, and can identify the network slice and the data network specified in the route selection descriptor.

In some implementations, the device can receive an updated URSP, wherein the updated URSP is generated by a first network function device included in a network, and wherein the updated URSP includes a new URSP rule, for the application, that is associated with another network slice that is created by a second network function device included in the network; the device can identify the other network slice specified by the new URSP rule included in the updated URSP; and the device can attempt to establish another data session, for the application, using the other network slice specified by the new URSP rule and another data network specified by the new URSP rule, wherein the network slice and the other network slice are different network slices.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by an application policy handler (APH) component in a device, a request for a data session for an application associated with the device;
   identifying, by the APH component, a user equipment route selection policy (URSP) rule, of one or more URSP rules, associated with the application;
   selecting, by the APH component, a first route selection descriptor of a plurality of route selection descriptors included in the URSP rule,
      wherein the first route selection descriptor is selected based on respective priorities associated with the plurality of route selection descriptors;
   identifying, by the APH component:
      a first network slice specified by the URSP rule and included in the first route selection descriptor, and
      a data network specified by the URSP rule and included in the first route selection descriptor;
   attempting, by the APH component and using a modem component included in the device, to establish the data session using the first network slice and the data network,
      wherein traffic is routed using the first network slice and the data network, or
      wherein a second network slice, specified by the URSP rule and associated with a second route selection descriptor, is identified based on the attempting to establish the data session using the first network slice and the data network being unsuccessful receiving, by the APH component, an updated URSP rule,
      wherein the updated URSP rule includes a modified URSP rule, and
      wherein the modified URSP rule includes at least one of:
         identifying an additional application to which the modified URSP rule is associated,
         excluding information identifying an application that was associated with the modified URSP rule before the modified URSP rule was modified,
         including information specifying a new route selection descriptor,
         including information specifying a modified route selection descriptor, or
         excluding information identifying a route selection descriptor that was removed from the modified URSP rule; and
   attempting, by the APH component, to establish another data session based on the updated URSP rule.

2. The method of claim 1, further comprising:
   identifying a session and service continuity (SSC) mode specified by the URSP rule,
   wherein when attempting to establish the data session comprises:
      attempting to establish the data session based on the SSC mode specified by the URSP rule.

3. The method of claim 1, wherein identifying the URSP rule comprises:
   identifying a traffic descriptor field included in the URSP rule; and
   determining that the traffic descriptor field, included in the URSP rule, identifies the application.

4. The method of claim 1,
wherein the updated URSP rule is generated by a first network function device included in a network,
wherein the updated URSP rule includes a new URSP rule, for the application, that is associated with a third network slice that is created by a second network function device included in the network and
wherein the method further comprises:
identifying the third network slice; and
attempting to establish another data session, for the application, using the third network slice and another data network specified by the new URSP rule,
wherein the first network slice and the third network slice are different network slices.

5. The method of claim 4, wherein the first network function device and the second network function device communicate with the device using at least one of:
a user plane function (UPF) device,
a session management function (SMF) device,
an access and mobility management function (AMF) device,
a policy control function (PCF) device, or
a network slice selection function (NSSF) device.

6. The method of claim 1, wherein the one or more URSP rules are stored in a URSP store included in the device.

7. The method of claim 1, wherein the data network specified by the URSP rule associated with the application comprises:
a default data network specified by the URSP rule associated with the application;
wherein the method further comprises:
determining that the request for the data session does not specify a particular data network; and
wherein identifying the data network specified by the URSP rule associated with the application comprises:
identifying the default data network based on determining that the request for the data session does not specify a particular data network.

8. A device, comprising:
one or more memories; and
one or more processors, communicatively coupled to the one or more memories, to:
receive, using an application policy handler (APH) component included in the device, a request for a data session for an application associated with the device;
identify, using the APH component, a user equipment route selection policy (URSP) rule, associated with the application, included in a URSP;
select a first route selection descriptor of a plurality of route selection descriptors included in the URSP rule,
wherein the first route selection descriptor is selected based on respective priorities associated with the plurality of route selection descriptors;
identify, using the APH component:
a network slice specified by the URSP rule and included in the first route selection descriptor, and
a data network specified by the URSP rule and included in the first route selection descriptor;
attempt, using the APH component, to establish the data session using the network slice and the data network,
wherein traffic is routed using the network slice and the data network, or
wherein another network slice, specified by the URSP rule and associated with a second route selection descriptor, is identified based on the attempting to establish the data session using the network slice and the data network being unsuccessful;
receive an updated URSP rule,
wherein the updated URSP rule includes a modified URSP rule, and
wherein the modified URSP rule includes at least one of:
identifying an additional application to which the modified URSP rule is associated,
excluding information identifying an application that was associated with the modified URSP rule before the modified URSP rule was modified,
including information specifying a new route selection descriptor, including information specifying a modified route selection descriptor, or
excluding information identifying a route selection descriptor that was removed from the modified URSP rule; and
attempt to establish another data session based on the updated URSP rule.

9. The device of claim 8, wherein a first network function device is associated with the data network, and
wherein the first network function device communicates with the device using at least one of:
a user plane function (UPF) device,
a session management function (SMF) device,
an access and mobility management function (AMF) device,
a policy control function (PCF) device, or
a network slice selection function (NSSF) device.

10. The device of claim 8, wherein the one or more processors are further to:
determine that the attempt to establish the data session using the network slice was unsuccessful;
identify, based on a second route selection descriptor priority specified in the URSP rule, the other network slice specified by the URSP rule; and
attempt to establish the data session using the other network slice and the data network.

11. The device of claim 8, wherein the one or more processors are further to:
identify a session and service continuity (SSC) mode specified by the URSP rule,
wherein the one or more processors, when attempting to establish the data session, are to:
attempt to establish the data session based on the SSC mode.

12. The device of claim 8, wherein the one or more processors, when identifying the URSP rule associated with the application, are to:
identify a traffic descriptor field included in the URSP rule; and
determine that the traffic descriptor field, included in the URSP rule, identifies the application.

13. The device of claim 8,
wherein the one or more processors, when identifying the network slice and the data network, are to:
identify the first route selection descriptor based on a route selection descriptor priority associated with the first route selection descriptor; and
identify the network slice and the data network specified in the first route selection descriptor.

14. The device of claim 8,
wherein the updated URSP rule is generated by a first network function device included in a network,
wherein the updated URSP rule includes a new URSP rule, for the application, that is associated with an additional network slice that is created by a second network function device included in the network, and
wherein the one or more processors are further configured to:
identify the additional network slice specified by the new URSP rule included in the updated URSP rule; and
attempt to establish another data session, for the application, using the additional network slice specified by the new URSP rule and another data network specified by the new URSP rule,
wherein the network slice and the additional network slice are different network slices.

15. A non-transitory computer-readable medium storing instructions, the instructions comprising:
one or more instructions that, when executed by one or more processors of a device, cause the one or more processors to:
receive, using an application policy handler (APH) component included in the device, a request for a data session for an application associated with the device;
identify, using the APH component, a user equipment route selection policy (URSP) rule, associated with the application, included in a URSP;
wherein the URSP rule is stored in a URSP store included the device; and
select a first route selection descriptor of a plurality of route selection descriptors included in the URSP rule,
wherein the first route selection descriptor is selected based on respective priorities associated with the plurality of route selection descriptors;
identify, using the APH component:
a network slice specified by the URSP rule and included in the first route selection descriptor, and
a data network specified by the URSP rule and included in the first route selection descriptor;
attempt to establish the data session using the network slice and the data network,
wherein traffic is routed using the network slice and the data network, or
wherein another network slice, specified by the URSP rule and associated with a second route selection descriptor, is identified based on the attempting to establish the data session using the network slice and the data network being unsuccessful;
receive an updated URSP rule,
wherein the updated URSP rule includes a modified URSP rule, and
wherein the modified URSP rule includes at least one of:
identifying an additional application to which the modified URSP rule is associated,
excluding information identifying an application that was associated with the modified URSP rule before the modified URSP rule was modified,
including information specifying a new route selection descriptor, including information specifying a modified route selection descriptor, or
excluding information identifying a route selection descriptor that was removed from the modified URSP rule; and
attempt to establish another data session based on the updated URSP rule.

16. The non-transitory computer-readable medium of claim 15, wherein the URSP store includes a plurality of URSP rules.

17. The non-transitory computer-readable medium of claim 15, wherein the one or more instructions, when executed by the one or more processors, further cause the one or more processors to:
determine that the attempt to establish the data session using the network slice was unsuccessful;
identify, based on a second route selection descriptor priority specified in the URSP rule, the other network slice specified by the URSP rule; and
attempt to establish the data session using the other network slice and the data network.

18. The non-transitory computer-readable medium of claim 15, wherein the one or more instructions, when executed by the one or more processors, further cause the one or more processors to:
identify a session and service continuity (SSC) mode specified by the URSP rule,
wherein the one or more instructions, that cause the one or more processors to attempt to establish the data session, cause the one or more processors to:
attempt to establish the data session based on the SSC model.

19. The non-transitory computer-readable medium of claim 15, wherein the one or more instructions, that cause the one or more processors to identify the URSP rule, cause the one or more processors to:
identify a traffic descriptor field included in the URSP rule; and
determine that the traffic descriptor field, included in the URSP rule, identifies the application.

20. The non-transitory computer-readable medium of claim 15,
wherein the updated URSP rule is generated by a first network function device included in a network,
wherein the updated URSP rule includes a new URSP rule, for the application, that is associated with an additional network slice that is created by a second network function device included in the network, and
wherein the one or more instructions, when executed by the one or more processors, further cause the one or more processors to:
identify the additional network slice; and
attempt to establish another data session, for the application, using the additional network slice and another data network specified by the new URSP rule,
wherein the network slice and the additional network slice are different network slices.

* * * * *